United States Patent [19]
Knurr et al.

[11] Patent Number: 5,725,065
[45] Date of Patent: Mar. 10, 1998

[54] VEHICLE HOOD ASSEMBLY

[75] Inventors: Randal S. Knurr, Waterford; James W. Haines, Oak Creek; Lynn G. Westbrook, Racine, all of Wis.

[73] Assignee: Textron Inc., Providence, R.I.

[21] Appl. No.: 580,828

[22] Filed: Dec. 29, 1995

[51] Int. Cl.⁶ .................................................. B62D 25/10
[52] U.S. Cl. .................. 180/69.2; 180/69.21; 180/69.24; D15/31
[58] Field of Search ........................ 180/69.2, 69.21, 180/69.24; D15/31

[56] References Cited

U.S. PATENT DOCUMENTS

| | | | |
|---|---|---|---|
| 2,086,172 | 7/1937 | Northup | 180/69 |
| 2,246,792 | 6/1941 | Dall | 16/128.1 |
| 2,311,965 | 2/1943 | Reynolds | 16/128.1 |
| 2,413,792 | 1/1947 | Sharp | 180/69 |
| 2,582,839 | 1/1952 | Lippard et al. | 280/153 |
| 2,620,889 | 12/1952 | McCormick | 180/69 |
| 2,672,942 | 3/1954 | Bayley | 180/69 |
| 2,761,523 | 9/1956 | Lee | 180/69.2 |
| 2,833,364 | 5/1958 | Lee | 180/69 |
| 3,216,760 | 11/1965 | Buchwald | 296/76 |
| 3,394,772 | 7/1968 | Abold | 180/69.2 |
| 3,834,478 | 9/1974 | Alexander et al. | 180/68.6 |
| 3,918,540 | 11/1975 | Haupt | 180/69 |
| 4,319,653 | 3/1982 | Carlson | 180/89.17 |
| 5,456,803 | 10/1995 | Kircher et al. | 180/69.21 |

FOREIGN PATENT DOCUMENTS

| | | | |
|---|---|---|---|
| 2045098 | 1/1992 | Canada | 180/69.2 |
| 2581950 | 11/1986 | France | 180/69.2 |
| WO 8001481 | 7/1980 | WIPO | 180/69.2 |

*Primary Examiner*—Brian L. Johnson
*Assistant Examiner*—Bridget Avery
*Attorney, Agent, or Firm*—Arthur J. Hansmann

[57] ABSTRACT

A vehicle having ground wheels and an engine and a radiator and a steering column. Hood segments are disposed over the aforementioned elements, and the segments are movable from positions adjacent the elements to positions remote from the elements, in order to expose the elements for servicing or the like. The several hood segments are interengageable and thereby secured in projected positions over the aforementioned elements, and they are arranged to be moved for full exposure of the aforementioned elements.

13 Claims, 3 Drawing Sheets

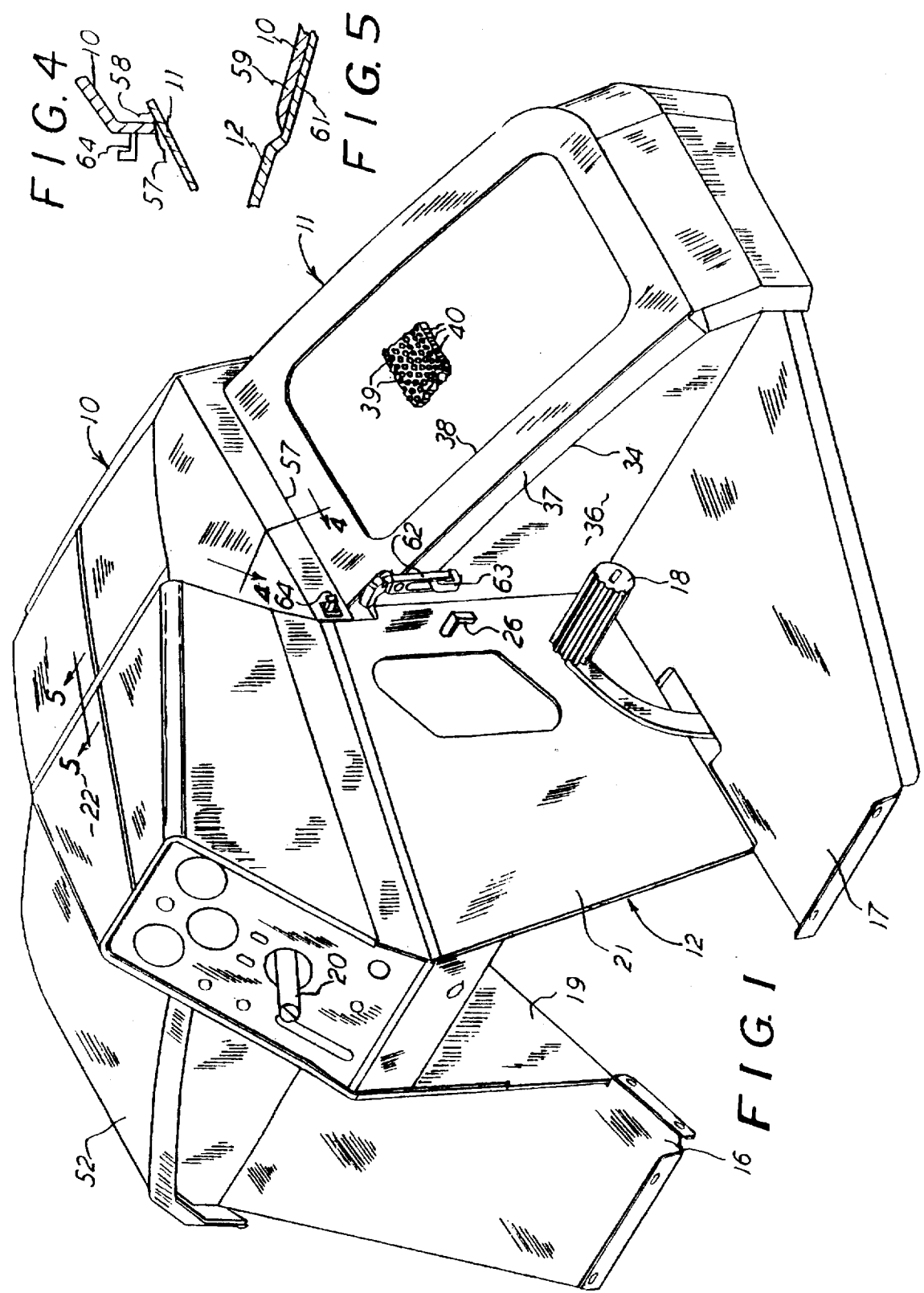

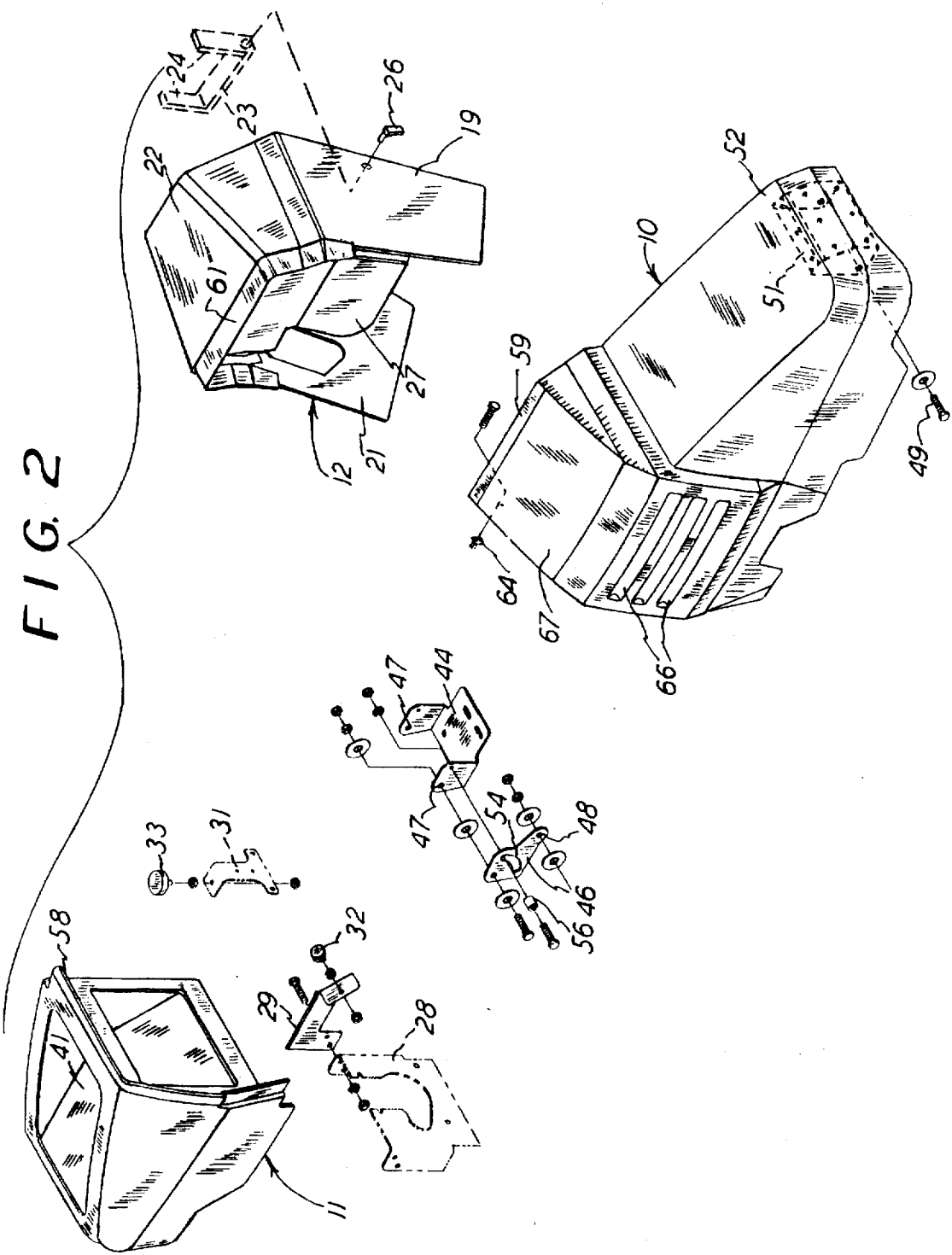

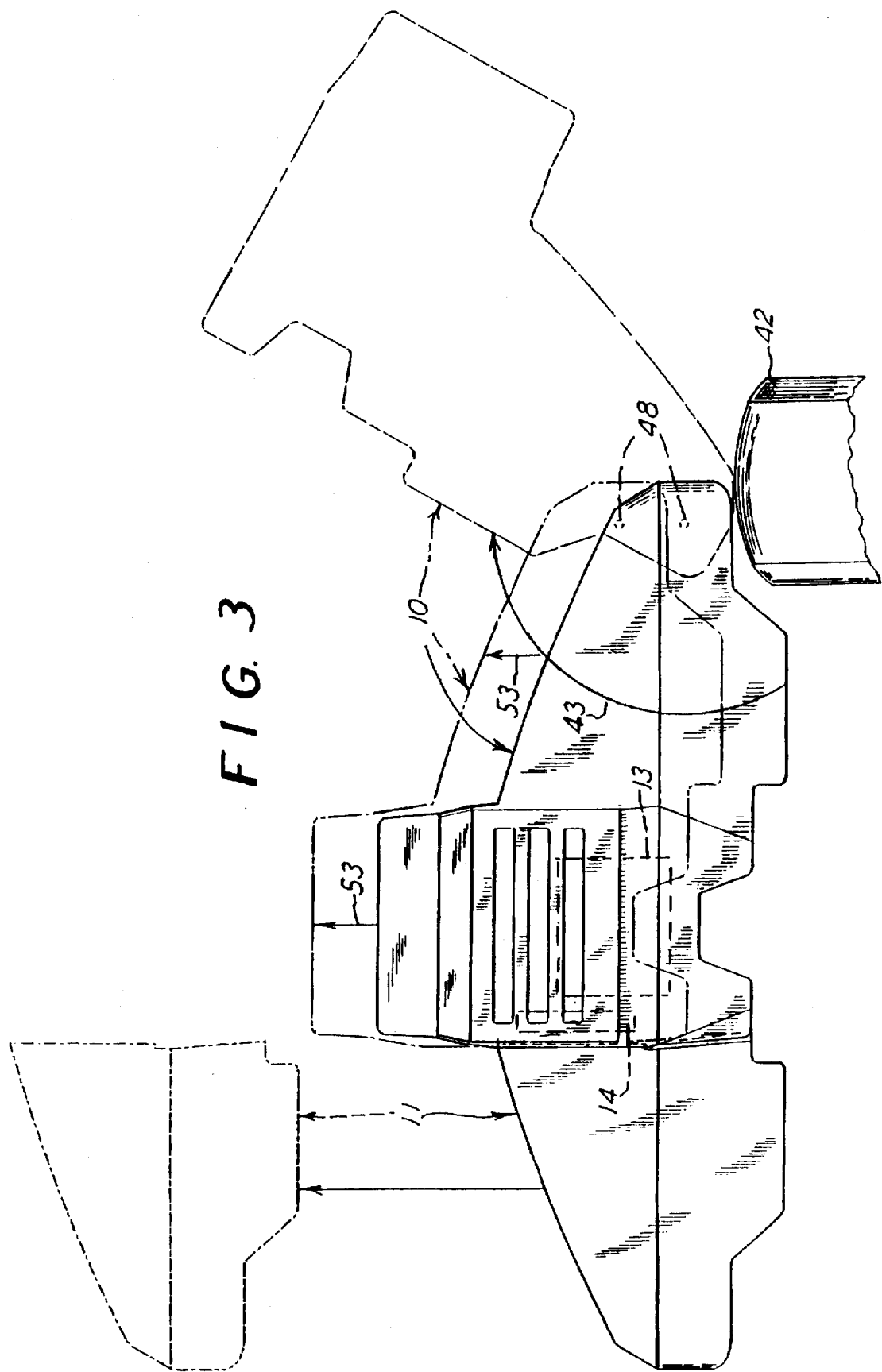

VEHICLE HOOD ASSEMBLY

This invention relates to a hood assembly for a vehicle, and, more particularly, it is a vehicle which has the usual engine, radiator, steering column, ground wheels, and the like, and a hood assembly extends over some of the aforementioned elements. The assembly is arranged to be completely removable from its original position, such that the aforementioned elements are fully exposed for servicing or the like.

BACKGROUND OF THE INVENTION

Hood assemblies over vehicles are commonly known and employed. Commonly the known hoods are in one piece and they extend over the vehicle engine compartment and can be opened to one side of the fore-and-aft direction of the vehicle, such as seen in U.S. Pat. Nos. 2,246,792, and 2,311,965, and 2,620,889 and 2,672,942. Also, U.S. Pat. No. 4,319,653 shows a hood-type assembly in multiple segments and wherein the respective segments are pivotally mounted for exposing the engine compartment or the like.

In the prior art examples, the hoods are not arranged in multiple segments with each segment thereof shrouding a particular element of the vehicle, and with each segment being removable from its covering position to thereby expose the vehicle elements which are underneath. Still further, the prior art hoods are not arranged to be completely removed from their locations extending over the vehicle elements mentioned, or they are not opened to locations which completely remove them from obstructing access to the vehicle elements otherwise covered by the hood. That is, in U.S. Pat. No. 4,319,653, for example, one of the segments blocks complete approach from the very front of the vehicle, and the other segments, when opened, block approach to the engine elements and from the side of the vehicle and significantly also thereabove, The present invention improves upon the prior art by providing a hood assembly wherein there are a plurality of hood segments, each of which covers a particular element of the vehicle, and each of the segments are removable from their covering position to positions which fully expose the elements otherwise underneath and on the vehicle.

Still further, the present invention provides for the hood assembly, as mentioned, and wherein the assembly is in a plurality of segments which interengage each other and thereby provide substantially one continuous covering for the vehicle elements therebelow, Further, the elements are arranged to either be completely removed from the vehicle, in a simplified maneuvering, or to be pivoted to a position which is completely clear of obstructing access to the vehicle engine compartment.

Still further, one of the plurality of hood segments, namely a radiator protective segment, is readily removable from the vehicle for cleaning an air filter screen protecting the radiator itself, That is, the screen cleaning can then be performed at a location away from the vehicle and can therefore be readily and completely accomplished in the cleaning process.

Other objects and advantages will become apparent upon reading the following description in light of the accompanying drawings.

BRIEF DESCRIPTION OF THE DRAWINGS

FIG. 1 is a right rear perspective view of a portion of the vehicle with the hood assembly shown thereon.

FIG. 2 is a right front exploded view of the hood segments shown in FIG. 1, with parts added thereto.

FIG. 3 is a front elevational view of the hood segments of FIG. 1, and with two of the segments shown in their removed positions.

FIG. 4 is a sectional view taken on the lines 4—4 of FIG. 1.

FIG. 5 is a sectional view taken on the lines 5—5 of FIG. 1.

DETAILED DESCRIPTION OF THE PREFERRED EMBODIMENT

This invention is particularly applicable to a vehicle of a functional type, such as a lawn mower, and it will therefore be understood by anyone skilled in the art that it pertains thereto and, accordingly, only the basic portions of the lawn mower, as necessary for this description, are shown and described herein, The arrangement is such that the working elements of the vehicles, such as the engine, radiator, steering column, and of course the ground wheels are all forwardly of the vehicle, and the hood assembly of this invention is therefore located to shroud those elements at the forward location of the vehicle. Further, the arrangement is such that the hood assembly is provided in multiple segments which are individual and separable from the vehicle to completely expose the engine, radiator, and the like for servicing, for instance.

Accordingly, FIG. 1 shows the hood assembly in its three segments designated 10, 11, and 12. These segments are all adequately supported on the vehicle to be in the position shown in FIGS. 1 and 3, and thus to cover the engine designated 13 in FIG. 3 and the radiator designated 14 in FIG. 3. It will be further seen and understood that the vehicle is a riding vehicle, such as a riding gang lawn mower, and there are two operator footrests 16 and 17, and an operator foot control pedal 18 which is the subject of another patentable invention of the owner herein. Thus, the operator straddles the hood segment 12 which is generally shown to be of an inverted U-shape and to extend downwardly in legs 19 and 21 off the substantially horizontally disposed upper portion 22. As such, the segment 12 presents an operator's console segment through which the steering column 20 would extend, and it is only fragmentarily shown in this disclosure for the interest of clarity in the drawings. FIG. 2 further shows the free-body view of the console or steering column segment 12 and here the inverted U-shape is also readily apparent, FIG. 2 further shows that a U-shaped bracket 23 is suitably affixed as part of the vehicle chassis, and it presents a mounting for the steering column segment 12 to hold the segment 12 to the vehicle or chassis 23. That is, the portion 23 has upstanding legs 24 which are positioned on the inside vertical walls 19 and 21, and there is a fastener 26 which extends through each of the two walls 19 and 21 and into the legs 24 of the bracket 23, all for affixing the hood segment 12 relative to the vehicle and its chassis. Thus, in a suitable manner of affixing the hood segment 21 to the vehicle, such as to the vehicle chassis portion 23, the hood segment 12 is positioned and affixed. Also, it can be readily removed by simple maneuvering of the faster 26 to release the hood segment 12 from the bracket 23 for complete removal of the segment 12 from the vehicle, as more fully described later.

The segment 12 also includes a panel 27 which is substantially disposed and is therefore positioned between the vehicle engine 13 and the operator whose feet are on the footrests 16 and 17. As such, the operator is protected from the engine heat and the like, and the segment 12 presents that feature of operator protection.

Next, hood segment 11 is also suitably supported on the vehicle chassis such as through the chassis upstanding portion 28 which is suitably affixed to the chassis and which carries brackets 29 and 31, with the bracket 31 being suitably attached to and centered relative to the chassis portion 28. That is, the brackets 29 and 31 are both mounted on the chassis portion 28, in any suitable manner, and they respectively present upward cushioned bumper supports 32 and 33. There is a support 32 on each side of the upstanding chassis portion 28, and the support 32 is shown at an angle relative to the vertical, and it is positioned underneath and in contact with the hood segment 11 to support the segment 11 upwardly and inwardly toward the center plane of the vehicle, and therefore toward the radiator 14, when the segment 11 is resting downwardly on the two spaced-apart cushion supports 32. Also, the support 33 is disposed underneath the hood segment 11 to upwardly support the latter, and thus the hood segment 11 is upwardly supported on the vehicle chassis. Both FIGS. 1 and 2 show that the rearward portion of the segment 11 has a complete vertical wall 35, and, as shown in FIG. 1, the rearward portion also has an edge designated 34. However, at that location, the footrest 17 has an upstanding portion designated 36, and the hood segment 11 has an upper corner 37. The wall 35 is disposed within and thus nests with the upstanding footrest wall 36.

It will also be seen that the segment 11 has a large top opening designated 38, and an air-filtering screen 39 is positioned in that opening for filtering air flowing downwardly past the screen 39 and to the radiator 14 and also to the engine 13. The screen 39 is actually a metal plate with air passage openings 40 therein. Also, the opening 38 is larger than the leftwardly facing surface of the radiator 14, as viewed in FIG. 3, and thus the opening 38, even with the screen 39 therein, provides a greater air passageway than the projected front face of the radiator 14, and thus ample cooling air is induced to flow through the opening 38 and through the radiator 14. An angulated plenum wall 41 is suspended in the segment 11 and faced toward the radiator 14 for directing air flow to the radiator 14.

Next, the hood assembly 10 is shown to be pivotally mounted on the vehicle in the area of the vehicle left front wheel 42. Thus, as seen in FIG. 3, the segment 10 pivots leftwardly, compared to the forward-looking direction of the vehicle, and it moves in the direction of the arc designated 43 and to the dot-dash line position shown,and the end 52 of the segment 10 is spaced just above the top of the vehicle wheel 42 so that the segment 10 rests on the fixed stop 45 and above the left front vehicle wheel When it is in the removed or open position.

FIG. 2 shows the pivot mounting for the section 10, and the mounting is on the vehicle chassis by means of the vehicle chassis bracket 44 which is affixed to the vehicle. A pivot arm 46 is pivotally mounted on the chassis 44 at the pivot point 47, and of course there would be an arm 46 on each side of the bracket 44. The arms 46 present pivot holes 48 which receive a pivot screw 49 extending therethrough and extending into a box member 51 affixed to the interior of the end 52 of the segment 10. That is, the box 51 is suitably affixed to the hollow interior of the segment end 52, and the screws 49, one on each side of the box 51, attach the arms 46 to the box 51 such that the segment 10 can pivot as shown and mentioned in connection with FIG. 3.

A further arrangement is provided with regard of the pivot mounting of the segment 10, and that is, as shown in FIG. 3, to provide for vertical lifting of the segment 10 prior to the pivoting thereof to the right, as viewed in FIG. 3. The two arrows designated 53 show the vertical lifting of the segment 10. FIG. 2 shows that the arms 46 have arcuate slots 54 extending therethrough, and each slot is centered about the pivotal opening 47 and each slot 54 receives a spacer 56. Accordingly, the segment 10 can be lifted vertically, as mentioned, and the arms 46 will simply pivot about the pivot axis 47 to thus elevate the pivot axes 48 and the corresponding segment end 52, as shown by the arrows 53. That permits the segment 10 to move spaced from and therefore clear of the segments 11 and 12. Next, the end 52 is then pressed downwardly to pivot the arms 46 down to the original position, and the segment 10 is then pivoted to the broken line position shown in FIG. 3.

It will thus be seen and understood that the hood assembly is arranged so that the three segments are separate segments and can be separately supported and removed from the vehicle, though the sequence thereof should be as indicated in the foregoing. That is, once the segment 10 is put into its broken line position of FIG. 3, then the segment 11 can be removed, and, upon release of the fasteners 26, the segment 12 can also be removed, if desired. Conversely, once the segment 12 is in its position fastened onto the vehicle, then the segment 11 is also positioned and upwardly supported on the pads 32 and 33, and finally the segment 10 is pivoted downwardly, as shown in full lines in FIGS. 1 and 3, and thus all of the segments are in position on the vehicle. The segment 10, as seen in FIG. 4, has its lower edge at 57 overlying the edge 58 of the segment 11, and thus the segment 10 further serves to hold the segment 11 downwardly. Also, FIG. 5 shows that the edge 59 of the segment 10 overlaps the edge 61 of the segment 12, and thus the two segments are mutually supportive in that overlapped relationship.

In a final attachment, an elastic band 62 is shown on an anchor 63 on the footrest panel 36, and the band 62 can extend upwardly to a latch 64 on the segment 10 for holding the segment 10 downwardly at that distal end from its pivot at 48. That is, there is a releasable fastener, designated 62, which extends between the vehicle itself and the segment 10 for holding the segment 10 downwardly, and of course that segment 10 overlaps the other two segments 11 and 12, all for the security of the segments.

Upon release and removal, the three segments 10, 11, and 12, can be placed in the separated positions, such as indicated in FIG. 2, and also FIG. 3 shows that the segment 11 is raised off the vehicle, in accord with the dotted position shown in FIG. 3.

FIG. 3 further shows that the segment 10 has a grill in the front thereof, as seen by the openings 66. It will also be understood that the segments are generally of hollow or shell configuration, and therefore basically have a uniform wall thickness throughout their extents, and thus they are preferably made of a sheet type or plastic material to shroud the vehicle functional elements, such as those mentioned and shown herein.

It will be seen and appreciated that the segment 10 is swung to the left side, as shown in FIG. 3, to just above the wheel 42, and, as such, it is out of the way and is only occupying the vertical space of the wheel below. The radiator segment 11, when fully removed from the vehicle can have its screen 39 readily cleaned remote from the vehicle.

Of course the pivot axis at 48 is disposed and shown to extend horizontally in the fore-and-aft direction of the vehicle, and thus the leftward pivot action for the segment 10 is accomplished, as described and shown. Further, the segment 10 then contacts the segments 11 and 12 at the end 67 thereof which is distal from the pivot axis or opening 48.

What is claimed is:

1. In a vehicle having a chassis, an engine, a radiator, and grounds wheels for movement of the vehicle in fore-and-aft directions, the improvement comprising an assembly of three separable engine hood segments supported on said chassis and being arranged to extend over said engine and said radiator and be in contact with each other, a first one of said segments extending adjacent said radiator and having an opening therein for the passage of air to said radiator and being free of any physical attachment, a second one of said segments extending contiguous to said first segment, a third one of said segments extending in a space directly above said engine in an operative position which is downward and to thereby overlie and be in contact with both said first and said second segments and thereby being arranged to hold said first and said second segments limited in upward movement and with said third segment having a pivot axis extending horizontally and parallel to said fore-and-aft directions and directly above one of said ground wheels, and said third segment being arranged for pivoting upwardly out of contact with said first and said second segments to a storage position directly above said one of said ground wheels and to thereby release said first and said second segments from said limited upward movement, and a latch interconnected with said third segment and said chassis and being arranged to releasably hold said third segment downwardly in said operative position.

2. The vehicle as claimed in claim 1, including a rest on said chassis adjacent said pivot axis and being arranged to support said third segment when said third segment is in said storage position.

3. The vehicle as claimed in claim 1, including supports on said chassis beneath said first segment and arranged to respectively upwardly support said first segment and with said supports being disposed at an inclined angle arranged to cause said first segment to be urged to move in the horizontal direction, and said first segment being disposed adjacent to said radiator to have said radiator disposed in the path of said horizontal direction urging of said first segment and thereby be arranged to have said first segment direct said passage of air toward said radiator.

4. The vehicle as claimed in claim 1, including an air filter screen on said first segment and being disposed to extend throughout said opening in said first segment for the filtering of said passage of air, and a wall disposed in said first segment and extending from adjacent said opening to a location adjacent said radiator for directing air to said radiator.

5. The vehicle as claimed in claim 4, wherein said radiator has a face of a selected total area for the passage of air through said radiator, and said opening and said screen are co-extensive throughout a common area and arranged to provide an air passageway through said screen which is greater than said total area of said radiator.

6. In a vehicle having a chassis, an engine, a radiator having a face for receiving a flow of air, and grounds wheels for movement of the vehicle in fore-and-aft directions, the improvement comprising an assembly of separable hood segments being free of being attached to each other and being supported on said chassis and being arranged to be in contact with each other, a first one of said segments extending adjacent said radiator at said face of said radiator and having an opening in said first segment for the passage of air to said radiator and with said first segment being free of being physically attached to the remainder of said vehicle, a second one of said segments extending in the space directly above said engine in an operative position which is downward and to thereby overlie and be in contact with said first segment and thereby being arranged to hold said first segment downwardly and against upward movement relative to said second segment, said second segment being pivotally mounted on said chassis on a pivot axis extending horizontally and parallel to said fore-and-aft directions and directly above one of said ground wheels, and said second segment being arranged for pivoting upwardly in a vertically plane transverse to said fore-and-aft directions and out of contact with said first segment to a storage position directly above said one of said ground wheels and to thereby release said first segment from being held downwardly by said second segment, and a latch interconnected with said second segment and said chassis and being arranged to releasably hold said second segment downwardly in said operative position.

7. The vehicle as claimed in claim 6, including supports on said chassis beneath said first segment and arranged to respectively upwardly support said first segment and with said supports being disposed at an inclined angle arranged to cause said first segment to be urged to move in the horizontal direction, and said first segment being disposed relative to said radiator to have said horizontal direction urging toward said radiator and said first segment being arranged to have said first segment direct the passage of air through said opening and toward said radiator.

8. The vehicle as claimed in claim 6, including an air filter screen on said first segment and being disposed to extend throughout said opening in said first segment, and with said screen being arranged to have a total air passageway greater than the total air passage for the flow of air for said radiator face.

9. The vehicle as claimed in claim 6, including means for pivotally mounting said second segment in an arrangement for moving said pivot axis upwardly relative to said chassis prior to pivoting said second segment.

10. The vehicle as claimed in claim 6, including pivot arms mounted on said chassis and being arranged such that said pivot axis is on said arms, and whereby pivoting of said arms moves said pivot axis upwardly prior to pivoting said second segment upwardly out of contact with said first segment.

11. The vehicle as claimed in claim 6, including a wall disposed in said first segment and extending from adjacent said opening to a location adjacent said radiator and being arranged to have said first segment serve as a plenum for said radiator in said passage of air through said first segment.

12. The vehicle as claimed in claim 6, including said second segment having two end portions disposed spaced apart on said second segment, said pivot axis being disposed on a first one of said end portions, and said latch being disposed on one of said end portions which is opposite from said first one of said end portions.

13. The vehicle as claimed in claim 8, wherein said radiator has a face of a selected total area for the passage of air through said radiator, and said opening and said screen are co-extensive throughout a common area and are arranged to provide an air passageway through said screen which is greater than said total area of said radiator.

* * * * *